United States Patent [19]

Losehand

[11] 4,046,971
[45] Sept. 6, 1977

[54] SWITCHING ARRANGEMENT FOR TELEPHONE SUBSETS USING IMPULSE-TYPE PUSHBUTTON CALLING

[75] Inventor: Helmut Losehand, Dachau, Germany

[73] Assignee: Siemens Aktiengesellschaft, Munich, Germany

[21] Appl. No.: 689,043

[22] Filed: May 24, 1976

[30] Foreign Application Priority Data

May 23, 1975 Germany .............................. 2522957

[51] Int. Cl.² ............................................ H04M 1/44
[52] U.S. Cl. ................................ 179/90 K; 179/81 R
[58] Field of Search ................ 179/90 R, 90 K, 81 R, 179/16 EC

[56] References Cited

U.S. PATENT DOCUMENTS

| 3,856,982 | 12/1974 | Lawson et al. ................... 179/90 K |
| 3,932,707 | 1/1976 | Connolly et al. .................. 179/90 K |
| 3,956,596 | 5/1976 | Connolly et al. .................. 179/90 K |
| 3,969,592 | 7/1976 | Pipitone et al. ................... 179/90 K |

Primary Examiner—Kathleen H. Claffy
Assistant Examiner—Randall P. Myers
Attorney, Agent, or Firm—Schuyler, Birch, Swindler, McKie & Beckett

[57] ABSTRACT

A switching arrangement for telephone subsets having key-controlled selection units is described. The selection unit has three connection points and is replaceable. It includes a pulsing relay responsive to a pulse generator actuated by the selection keys. A bistable relay disables a speech circuit, and maintains a connection of a transmitting and feeding circuit extending through the selection unit.

3 Claims, 1 Drawing Figure

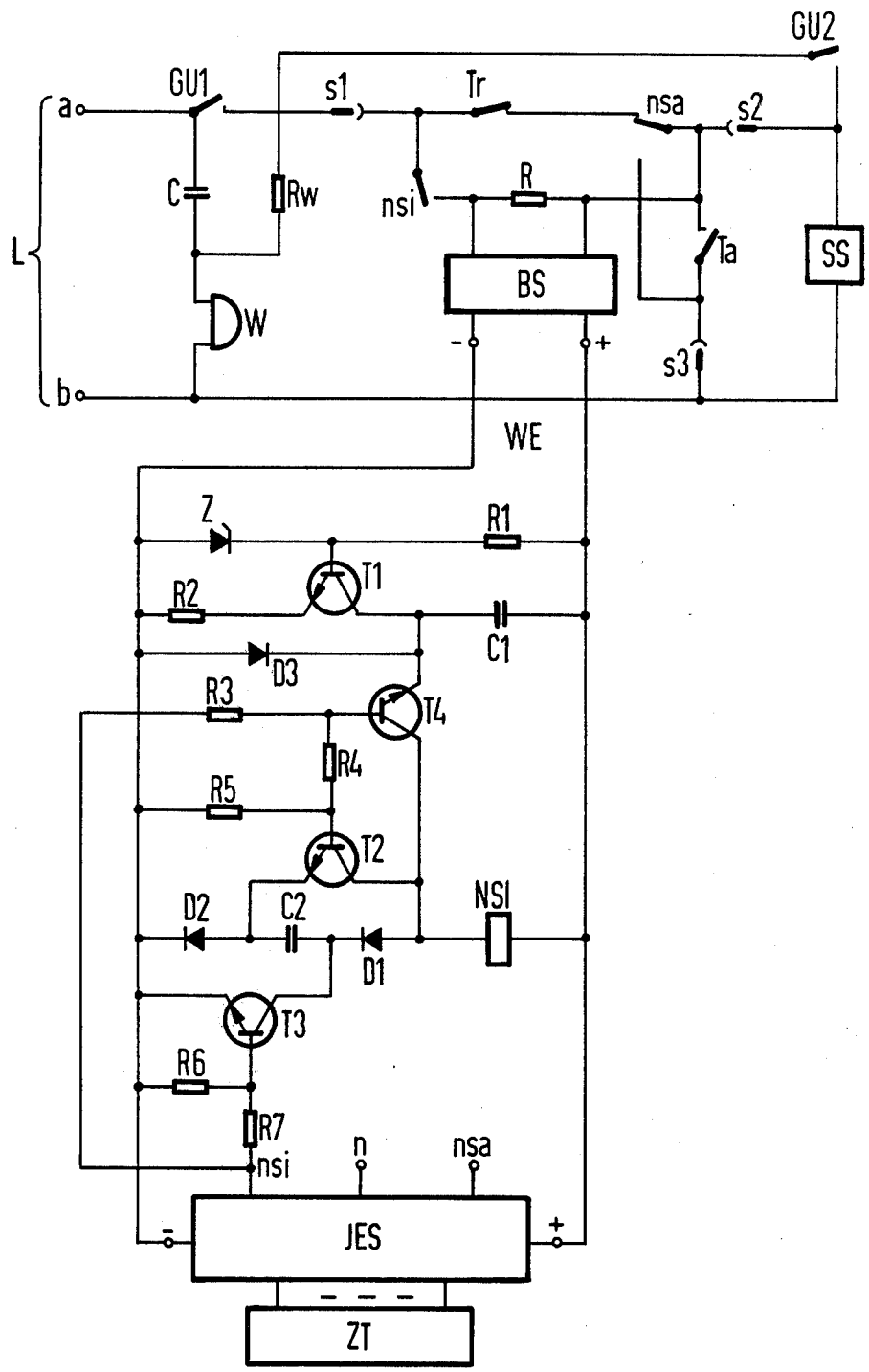

SWITCHING ARRANGEMENT FOR TELEPHONE SUBSETS USING IMPULSE-TYPE PUSHBUTTON CALLING

BACKGROUND OF THE INVENTION

The invention relates to a switching arrangement for telephone subsets using key-controlled selection units fed through charge storages via their connection lines in telecommunication systems.

An example of an arrangement of the general type is described in West German Unexamined Patent Applications 2323559 and 2345508. In addition, a number of other arrangements are known wherein semiconductor switches are employed instead of relays. However, as a rule such subsets cannot be used without limitations. For example, when such a subset is put into service, a loop and speech circuit is completed which extends over the two-wire connection line. The resulting current flowing through the connection line is recognized in the switching center and the connection line involved is connected to the continuing switching facilities. Certain conditions must be met by the monitoring circuit and the subsets in order for the switching center to recognize a closed loop without ambiguity. This is particularly true if monitoring circuits are employed with high-impedance line feeding, so that only weak monitoring currents flow through the line. If such monitoring circuits are used, the driving-point impedance of the subset must be comparatively low for a given line resistance. However, this condition is not satisfied if semiconductor switches are employed as contacts for the pulsing or for the changeover from the speaking to the dialing phase, and vice versa. The same is true if bistable relays are utilized to save energy, since normally one cannot prevent these relays from being changed over through initial current surges or the like, which results in the opening of the loop circuit necessary for the monitoring in the switching center.

In view of the foregoing, special measures are needed to bring bistable relays, if employed, to the initial position. For example, a suitable arrangement for accomplishing this is described in West German Examined Patent Application 2258839. Such a solution, however, requires additional cradle switches or switch hooks and additional connecting points for the selection unit, so that it is not capable of interworking directly with other prior art selection units.

Accordingly, it is an object of the invention to provide a switching arrangement for subsets that can operate with only three connection points for the selection unit and without the need for additional contacts.

SUMMARY OF THE INVENTION

The foregoing and other objects of the invention are realized in a subset construction wherein:

a. The pulsing relay is monostable and its only contact is connected in series with a resistor from a common pushbutton break contact in the pushbutton keyboard and with a break contact of the other relay in the speaking phase of the subset, and b. The feeding of the selection unit occurs in parallel with a resistor connected in series with an impulse contact, two or more capacitors being provided as charge storages.

In the latter arrangement one of the capacitors serves as a voltage doubler and supplies a cut-in voltage for the pulsing relay, while the other charge storage supplies, as a feeder capacitor, the supply current for the other units of the selection equipment and the holding current for the pulsing relay.

The invention takes advantage of the fact that without load the contacts of a monostable relay occupy a well-defined position. If such a relay is employed and the contact is disposed in the manner specified above, a low value driving point impedance of the subset is ensured at all times, regardless of the contact position of the other bistable relay, after the cradle switch has been closed. The greater energy necessitated by the monostable relay is provided by employing two capacitors, one of which causes the voltage to be doubled at turn-on time, while the other capacitor supplies only the holding current. This operation corresponds to that of saver circuits for relays, so that the arrangement is very economical to operate.

BRIEF DESCRIPTION OF THE DRAWING

Further details of the invention will be explained hereinbelow with reference to a preferred embodiment shown in schematic form in the drawing.

DETAILED DESCRIPTION OF THE PREFERRED EMBODIMENT

In the drawing a speech circuit SS which is connected to wires $a$ and $b$ of connection line L (corresponding to the T and R wires) and to a ringing circuit comprised of a capacitor C and the bell W. Further, selection unit WE is connected into the connection line via a three pole connector having connection points $s1$ to $s3$. These connection points are selected such that the selection unit can be replaced with minimum contact requirements by differently operating selection units.

The selection unit comprises the following units: a pushbutton keyboard ZT, a pulse generator JES producing differing pulse trains, respectively allocated to the individual keys, a pulsing relay NS1 which receives current from the transistor T2, T3, and T4, capacitors C2 and C1, of which the latter is charged as a feeder capacitor with constant current via transistor T1. Only the contact $nsa$ of a bistable relay NSA is shown, which is likewise controlled in a known manner by the pulse generator JES.

Tr and Ta designate common key contacts of the keyboard ZT; these may also be combined into a transfer contact. The transfer contact $nsa$ of the bistable relay and the common changeover contact would then form a series connection, whereby the break contacts electrically connect the T wire as a chain of contacts, while the speech circuit SS is short-circuited. Connected across the latter chain of break contacts is pulsing contact $nsi$ in series with a resistor by means of which the feeding of the selection unit WE takes place.

When the subset is put into service, whereby the cradle switch is operated with its contacts GU1 and GU2, the speech circuit SS is connected in a known manner to the connection line L and, further, resistor Rw is connected in series with the ringer capacitor C as a spark quencher and in parallel with the contacts in the T wire. As a rule, the operation of the cradle switches continues to have no effect on the selection unit, since the latter is short-circuited by the contact Tr, which is in series with the contact $nsa$. In this way, the subset is in the speech phase.

When, starting out from this operating condition, one of the keys of the keyboard ZT is operated, the speech circuit SS is disabled through short-circuit, and instead, the selection unit is looped into the connection line via overvoltage and reverse voltage protector BS. As a result, both capacitors C1 and C2 are charged. The charging of the capacitor C2 takes place via the coil of the relay NSI and the two diodes D1 and D2, while a controlled resistance in the form of the transistor T1 precedes the capacitor C1. The result is that the charging occurs with constant current strength and current starving the other units is avoided. The Zener diode Z limits the charging voltage of both capacitors.

At the same time, in a known manner not shown herein the pulse generator JES is reset to the starting condition via input n and is thus ready for operation. Accordingly, a signal is fed to the output nsa and continued until, after digit storage through the keyboard ZT, all the digits are transmitted in the form of a pulse train or a reset signal is no longer available at the input n, because the feeder and transmitter circuit has been opened. This signal switches the bistable relay NSA (not shown) in a known manner to the operative position identifying the dialing phase. Its only contact nsa is reversed, thereby short-circuiting the contact Ta, so that the dialing phase continues independent of the duration of the pushbutton operation. As a rule, the transistors T2, T3 and T4, controlled via the output nsi of the pulse generator JES, are non-conductive and are rendered conductive only for the duration of the individual pulses to be transmitted over the connection lines.

After the transistors T2 and T3 have been rendered conductive, the charged capacitor C2 is connected in series with the operating voltage fed over the overvoltage and reverse voltage protector BS, such that double the operating voltage appears momentarily at the relay NSI. The capacitor C2 is discharged and causes the relay NSI to respond. The latter breaks the subscriber loop which is extended over the resistance R2, by operating contact nsi, so that the pulse finds its way to the switching center in the form of an interruption.

In the periods during which the subscriber loop is opened in the course of the pulsing, the capacitor C1 uses its stored energy to supply power to the selection unit WE. It also supplies the holding current for the pulsing relay NSI, so that the latter remains energized after the capacitor C2 has been discharged, because the transistor T4, which has hitherto been held nonconductive, is rendered conductive when the potential across the collector becomes positive in relation to that across the emitter. At the end of every pulse the transistors T2, T3 and T4 are again held nonconductive via the output nsi, so that although the relay NSI is released, the capacitors C1 and, particularly, C2 are recharged.

As soon as all the digits stored in the selection unit have been transmitted, the latter returns to the normal position. The relay NSA (not shown) is again switched to the normal position via the output nsa of the pule generator JES. With the return of the contact nsa to the normal position the speech circuit SS, too, is enabled again, and the selection unit WE is disabled.

If initially, as the subset is put into service, the bistable relay NSA is not in its starting condition, so that the dialing phase prevails, this relay remains without effect, since initially with the adjusting of the pulse generator JES the bistable relay NSA would likewise be switched to the operative position, marking the dialing phase, and after a brief period would automatically be switched to the normal position if there is no pushbutton operation, so that the speaking phase is initiated.

Further measures may also ensure the recognition of a loop current interruption during the dialing phase because, for example, the subscriber receives the busy signal or has dialed incorrectly, thereby operating the cradle switch so as to bring about a connection release. However, it must be ensured that only loop current interruptions that last longer than the normal loop current interruptions brought about by the pulsing and cause the return of the talking phase are analyzed. Incorrect dialing due to retained digits are therefore prevented, since with each switchover to the dialing phase the pulse generator JES is reset, so that stored digits are erased before digits are accepted again from the keyboard ZT.

The principles of this invention are described by describing the construction and operation of a preferred embodiment. The described embodiment is to be considered only as being exemplary and can be modified or changed in a number of ways known to those skilled in the art while remaining within the scope of the invention, as defined by the appended claims.

I claim:

1. In a switching arrangement for a telecommunications set having a keyboard-actuated, replaceably connected selection unit, said selection unit having a pulse generator for producing pulse trains of differing characteristics in dependence on which of the keys is actuated, two relays in said selection unit, one of which controlled by said pulse generator serves for pulsing and the other, a bistable relay, is connected to disable the speech circuit of the subset during the duration of the pulse train from the pulse generator and the selection unit further including transmitting and feeding circuit means connected to the connection line to the subset upon actuation of one of the keys in the keyboard, the improvement comprising:

said one of said relays being a monostable pulsing relay in said selection unit operable responsive to actuation of said pulse generator.

first common key-actuated contact means including said other relay operable responsive to actuation of a key for disconnecting said speech circuit from the subset connection line, coupling means for connecting said selection unit to the subset connection line including at least a contact operated by said pulsing relay, said coupling means being short circuited by non-operation of said first common contact means, said transmitting and feeding circuit being connected to said coupling means for receiving current from the connection line and feeding said selection unit when said coupling means is connected to the connection line, said transmitting and feeding circuit including a current supply means comprising first capacitance means, charged from current received through said coupling means for functioning as a voltage doubler and supplying actuating pulses to said pulsing relay and second capacitance to said selection unit and a holding current to said pulsing relay.

2. The improved switching arrangement defined in claim 1 further comprising:

constant current means for charging said second capacitance means.

3. The apparatus defined in claim 1 wherein said first capacitance means is connected in series with the coil of said pulsing relay and is charged therethrough and further comprising:

switch means for connecting the coil to said second capacitance means for the duration of each pulse from said pulse generator.

* * * * *